US012431280B2

(12) United States Patent
Baipadi et al.

(10) Patent No.: US 12,431,280 B2
(45) Date of Patent: Sep. 30, 2025

(54) INDUCTOR WITH INCREASING OUTER FILL DENSITY

(71) Applicant: GlobalFoundries U.S. Inc., Malta, NY (US)

(72) Inventors: Varuna A. Baipadi, Bangalore (IN); Venkata Narayana Rao Vanukuru, Bangalore (IN); Muhammed Shafi Kunnathodi, Kerala (IN)

(73) Assignee: GlobalFoundries U.S. Inc., Malta, NY (US)

(*) Notice: Subject to any disclaimer, the term of this patent is extended or adjusted under 35 U.S.C. 154(b) by 967 days.

(21) Appl. No.: 17/543,808

(22) Filed: Dec. 7, 2021

(65) Prior Publication Data

US 2023/0178289 A1 Jun. 8, 2023

(51) Int. Cl.

*H01F 5/00* (2006.01)
*H01F 3/14* (2006.01)
*H01F 27/28* (2006.01)

(52) U.S. Cl.

CPC ........... *H01F 27/2804* (2013.01); *H01F 3/14* (2013.01); *H01F 2027/2809* (2013.01)

(58) Field of Classification Search

CPC .................................................. H01F 27/2804
USPC .......................................................... 336/200
See application file for complete search history.

(56) References Cited

U.S. PATENT DOCUMENTS

| | | | | |
|---|---|---|---|---|
| 7,262,481 | B1 | 8/2007 | Marques | |
| 7,276,435 | B1 | 10/2007 | Pozder et al. | |
| 8,159,044 | B1 | 4/2012 | Chen et al. | |
| 10,496,783 | B2 | 12/2019 | Mousa et al. | |
| 11,011,303 | B2 | 5/2021 | Lee et al. | |
| 2005/0212136 | A1* | 9/2005 | Karasawa | H01L 23/5227 257/516 |
| 2009/0096061 | A1* | 4/2009 | Uchida | H01L 23/528 257/E29.325 |
| 2014/0252542 | A1 | 9/2014 | Lee et al. | |

OTHER PUBLICATIONS

Tsuchiya, Akira, "Patterned Floating Dummy Fill for On-Chip Spiral Inductor Considering the Effect of Dummy Fill," IEEE Transactions on Microwave theory and Techniques, vol. 56, No. 12, 2008, pp. 3217-3222.

* cited by examiner

*Primary Examiner* — Ronald Hinson
(74) *Attorney, Agent, or Firm* — Francois Pagette; Hoffman Warnick LLC

(57) ABSTRACT

A structure includes a first layer having inductor windings. An inner area of the first layer is at least partially enclosed by the inductor windings and an outer area of the first layer is separated from the inner area by the inductor windings. This structure further includes a second layer having structural fill elements. The first layer and the second layer are parallel, and the second layer is relatively below the first layer in a direction perpendicular to the first layer. The density of the structural fill elements aligned below the inner area is less than the density of the structural fill elements aligned below the outer area.

20 Claims, 5 Drawing Sheets

INDUCTOR WITH INCREASING OUTER FILL DENSITY

BACKGROUND

Field of the Invention

The present disclosure relates to inductors, and more specifically, to inductors with fill elements.

Description of Related Art

Inductors are devices that sometimes have a two-terminal conductor (within an insulator) that is shaped in windings or coils (that are sometimes referred to as loops or turns). The conductor is shaped to increase the magnetic flux of the inductor, and the number of windings of the conductor increases the number of times the magnetic flux lines link, increasing the field and thus the inductance.

In multi-layer integrated circuits, the inductor can be a conductor within a portion of one of the layers and can be bordered by other insulator layers. Additionally, fill elements can be positioned in one or more surrounding layers. Such fill elements add structural stability to the integrated circuit and are usually formed of materials that have structural strength, such as metals, etc. However, such fill elements can influence the magnetic fields around the inductor, decreasing performance of the inductor.

SUMMARY

According to one embodiment herein, a structure includes (among other components) a first layer having inductor windings. An inner area of the first layer is at least partially enclosed by the inductor windings and an outer area of the first layer is separated from the inner area by at least one winding. This structure further includes a second layer having structural fill elements. The first layer and the second layer are parallel, and the second layer is relatively below the first layer in a direction perpendicular to the first layer. The density of the structural fill elements aligned below the inner area is less than the density of the structural fill elements aligned below the outer area.

In another structure herein, a first layer has inductor windings. An inner area of the first layer is at least partially enclosed by the inductor windings and an outer area of the first layer is separated from the inner area by at least one winding. This structure further includes a second layer having groups of structural fill elements. The first layer and the second layer are parallel, and the second layer is relatively below the first layer in a direction perpendicular to the first layer. The number of structural fill elements in the groups of structural fill elements increases as distances increase from the location in the second layer that is aligned below the center of the inner area.

An additional structure herein includes a first layer having inductor windings. An inner area of the first layer is at least partially enclosed by the inductor windings and an outer area of the first layer is separated from the inner area by at least one winding. This structure also includes a second layer having structural fill elements. The first layer and the second layer are parallel, and the second layer is relatively below the first layer in a direction perpendicular to the first layer. The number of structural fill elements in the structural fill elements increases as distances increase from the location in the second layer that is aligned below the center of the inner area. Additionally, the distance between the first layer and the structural fill elements decreases as distances increase from the location in the second layer that is aligned below the center of the inner area.

BRIEF DESCRIPTION OF THE DRAWINGS

The embodiments herein will be better understood from the following detailed description with reference to the drawings, which are not necessarily drawn to scale and in which.

DETAILED DESCRIPTION

As mentioned above, metallic fill elements in a layer that is adjacent to and insulated from an inductor's coil can add structural stability. However, the presence of such fill elements can influence the magnetic fields around the inductor, which increases parasitic capacitance and decreases performance of the inductor. It is especially challenging to get higher Q (quality factor) with low resistivity substrate technologies and such fill elements underneath the inductor further degrades the quality factor.

In view of such issues, with the structures disclosed below the density of the adjacent fill elements increases in locations moving radially outwards from the inner region of the coil to the outer region. In some structures the increasing density of the fill elements can be based on a voltage profile within the spiral of the coil, such as where the fill elements are only located underneath the spaces between the spiral metal strips. Additionally, the increasing density not only occurs parallel to the integrated structure's layers (e.g., not just parallel to the X-Y direction of the inductor fill material layers) but also perpendicular thereto (e.g., in the Z direction also).

Thus, with structures herein relatively more of the fill elements are positioned adjacent the outer region of the coil and the number of such structures per unit area tapers as locations move closer to the center of the coil, which reduces parasitic capacitance and improves the quality factor.

Figure 1A:
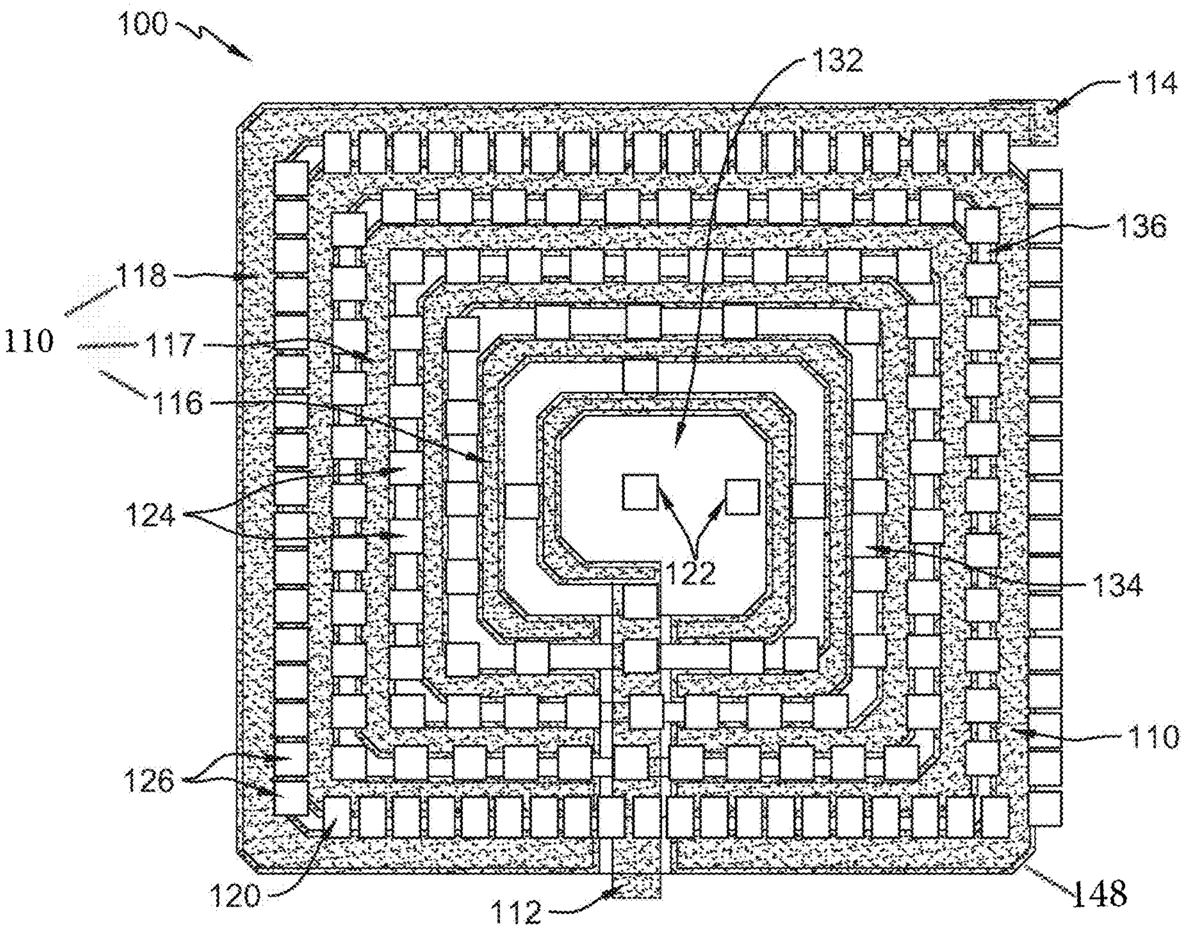
FIGS. 1A-1B are, respectively, layout-view and cross-sectional schematic diagrams illustrating an inductor structure according to embodiments herein.
Figure 1B:
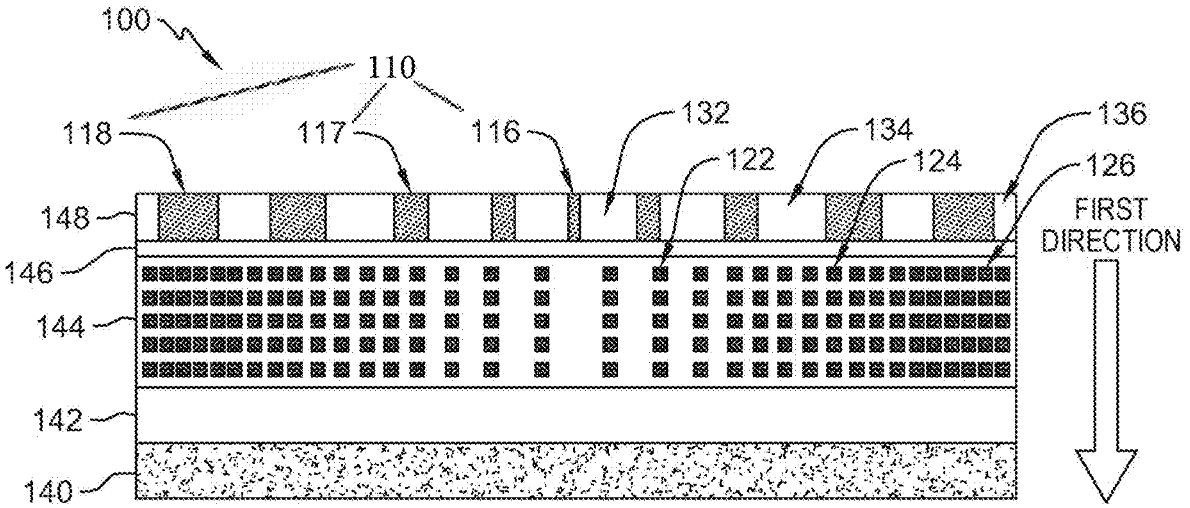

FIGS. 1A-1B conceptually illustrate one embodiment herein of an inductor structure 100 in layout view (FIG. 1A) and in cross-sectional view (FIG. 1B) that is perpendicular to the layout view. As shown in FIGS. 1A-1B, this exemplary inductor structure 100 includes (among other components) a first layer 148, which is an insulator having inductor windings 110 in the insulator. This structure further includes a second layer 144, which is a multi-layer insulator having structural fill elements 120 in the insulator and a third layer 146 which is an insulator. A substrate 140 and insulating layer 142 upon which the inductor structure 100 is formed are also shown in FIGS. 1A-1B.

As shown in FIG. 1B, the first layer 148 and the second layer 144 are parallel. Similarly, the third layer 146 is parallel to and between the first layer 148 and the second layer 144. For useful reference, an arbitrarily identified "first" direction (shown by block arrow in the drawings) that is perpendicular to the first layer 148 and the second layer 144 is illustrated in the accompanying drawings. The second layer 144 is arbitrarily referred to as being "below" the first layer 148 in the first direction. The terms "below;" "bottom;" etc., do not indicate any absolute location but instead refer only arbitrarily to a relative position in the "first" direction from another item. In such same arbitrary word usage, "above;" "top;" etc., refer to a relative position in a direction opposite the first direction from another item.

As can be seen most clearly in the view in FIG. 1A, different locations of the first layer 148 are identified using identification numbers 132, 134, and 136, where identification number 132 shows an inner area that is at the approximate center of the inductor windings 110, identification number 134 shows a mid-location that is outside the approximate center 132 of the inductor windings 110, and identification number 136 shows an outer area that is even further outside (a further distance from) the approximate center of the inductor windings 110 relative to the mid-location 134.

As shown in FIG. 1A, in this example the inductor windings 110 have two terminals 112, 114 and different windings of the inductor windings 110 are identified using identification numbers 116, 117, and 118. The inductor windings 110 in this example have an open loop shape where ends of the inductor windings 110 are electrically insulated from each other. While a single conductor, two contact, planar spiral coil structure is illustrated in FIG. 1A, the same concepts disclosed herein are equally applicable to multiple conductor, multiple contact, inductor structures of varying shapes.

As can be seen most clearly in FIG. 1A, in this exemplary structure 100 the inductor windings 110 have a rectangular, multi-winding spiral coil shape, where winding 116 is the innermost winding that is closest to the inner area 132 of the first layer 148, winding 117 is a middle winding a further distance from the inner area 132 of the first layer 148 relative to the innermost winding 116, and winding 118 is an outer winding that is even a further distance from the inner area 132 of the first layer 148 relative to the middle winding 117. While a planar spiral coil inductor shape is shown in FIG. 1A, the inductor windings 110 can be any useful shape such as a curved conductor, a rectangular conductor, a polygonal conductor, multiple windings electrically isolated from each other, multiple, concentric, non-overlapping windings, etc., and the shape of the inductor windings 110 shown in FIG. 1A is intended to generically illustrate all such shapes. In general then, the inductor windings 110 comprises at least one continuous, unbroken conductor formed in a plurality of non-overlapping successively larger windings (e.g., 117, 118) extending from the inner winding 116.

Therefore, the inner area 132 of the first layer 148 is at least partially enclosed by the inductor windings 110 and the outer area 136 of the first layer 148 is separated from the inner area 132 by at least one middle winding 117 of the inductor windings 110. As used herein the "inner" and "outer" terms simply refer to relative positions. Therefore, many windings of the inductor windings 110 are considered inner or outer windings relative to other windings (except the most inner winding 116 and the most outer winding 118 which are the extreme position windings).

The structural fill elements 120 in the second layer 144 can be any material that adds rigidity/stiffness to the insulator material that makes up the remainder insulator material in the second layer 144. Thus, the structural fill elements 120 can be metal, silicon, polymer, ceramic, etc., or any other convenient material that has a lower flexibility (greater stiffness) than the remaining insulator material of the second layer 144. In some embodiments, the structural fill elements 120 are generally all formed of the same material in any given structure to provide manufacturing convenience.

Further, the structural fill elements 120 can be any convenient shape (including, rectangular blocks, cylinders, spheres, cones, etc.) and are electrically insulated from each other and all other structures by the remaining insulator material of the second layer 144. The additional rigidity provided by the structural fill elements 120 adds structural support to the entire laminated, multi-layer inductor integrated structure 100; however, as noted above, the presence of such fill elements can influence the magnetic fields around the inductor, which can increase parasitic capacitance and decrease performance of the inductor.

In order to avoid performance consequences of using the structural fill elements 120 including structural fill elements 122, 124 and 126, in structures herein the density (meaning the number of elements per unit area) of the structural fill elements 120 decreases as distances from the inner area 132 increase. In some embodiments, the structural fill elements 120 are generally all formed to have the same size and shape in any given structure to provide manufacturing convenience.

Therefore, the density of the structural fill elements 122 that are aligned below the inner area 132 of the first layer 148 is less than the density of the structural fill elements 126 in the second layer 144 that are aligned below the outer area 136. Stated differently, the density of the structural fill elements 120 increases as distances increase from the center location in the second layer 144 (that is aligned below the center of the inner area 132).

Further, in the inductor structure 100 shown in FIGS. 1A-1B, the density of the structural fill elements 120 can increase continuously (smoothly, gradually, or at a constant rate of density increase) as distances from the inner area 132 increase. Thus, the density of the structural fill elements 120 successively increases in each area of the second layer 144 that is aligned below each successively larger winding (e.g., 117, 118, etc.).

Figure 2:
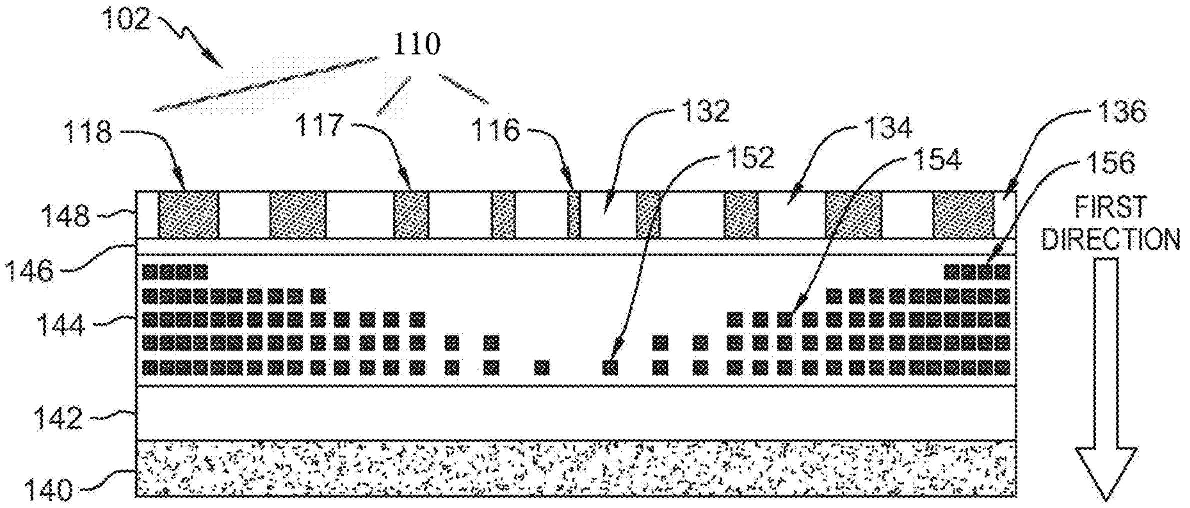
FIGS. 2-4 are cross-sectional schematic diagrams illustrating inductor structures according to embodiments herein.

FIG. 2 is a cross-sectional conceptual diagram that illustrates another inductor structure 102 herein that similarly includes the first layer 148 that has the inductor windings 110 in an insulator. Again, the inner area 132 of the first layer 148 is at least partially enclosed by the inductor windings 110 and the outer area 136 of the first layer 148 is separated from the inner area 132 by at least one winding of the inductor windings 110.

A layout view of the inductor structure 102 shown in FIG. 2 would appear similar to the layout view of the inductor structure 100 shown in FIG. 1A; however, as can be seen in the cross-sectional view in FIG. 2, the structural fill elements 152, 154, 156 in the inductor structure 102 are different distances from the first layer 148. This can be seen, for example, in FIG. 2. where the top ("top" again being a relative term, not absolute) of the innermost structural fill elements 152 is furthest from the first layer 148, the top of a mid-location structural fill elements 154 is closer to the first layer 148, and the top of the outermost structural fill elements 156 is even closer to the first layer 148. Again, this keeps the inner structural fill elements 152 further from the inductor windings 110 and contributes to reducing the parasitic capacitance affect the structural fill elements 152, 154, 156 can have on the inductor windings 110, thereby further enhancing Q.

Figure 3:
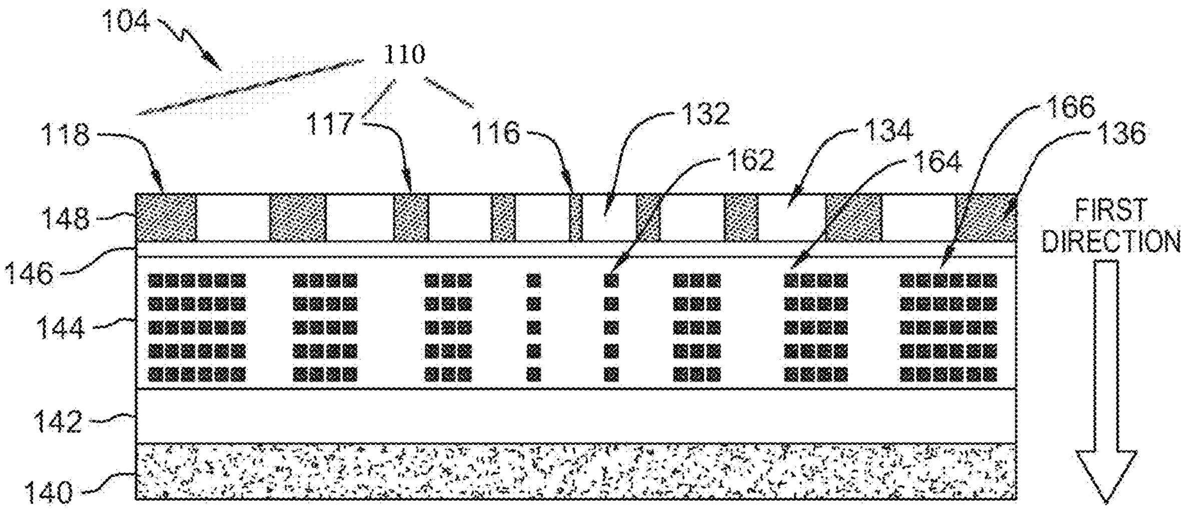
Figure 4:
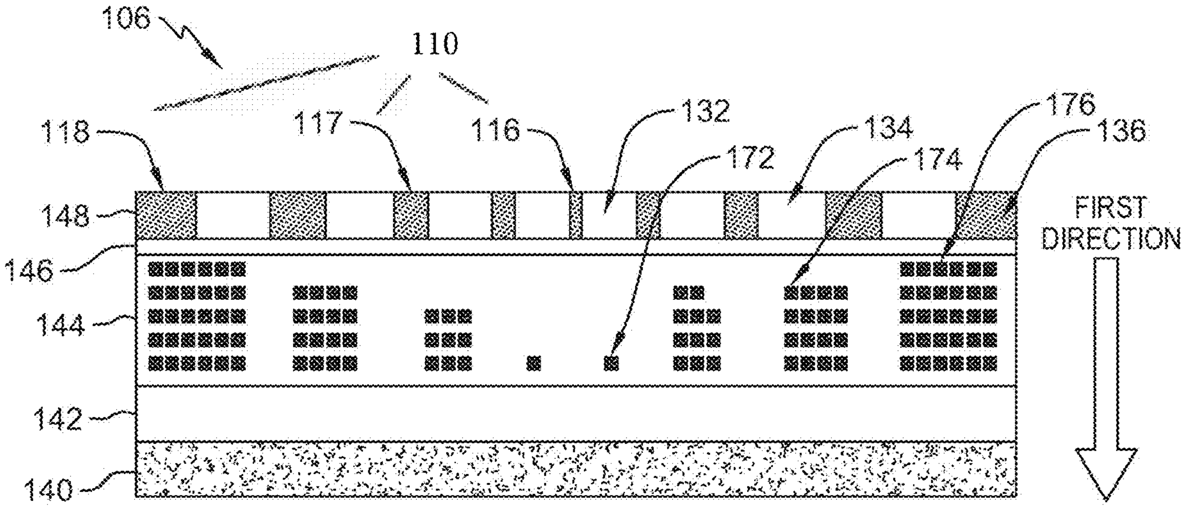

While the inductor structures 100, 102 shown in FIGS. 1A-2 have structural fill elements 120 that continuously/gradually become denser as distances increase from areas aligned with the inner area 132, in contrast the inductor structures 104, 106 shown in FIGS. 3 and 4 includes a second layer 144 having groups of structural fill elements 162, 164, 166; and 172, 174, 176 in the insulator where the number of structural fill elements in each group successively increases as distances from the center location in the second layer 144 increase causing a corresponding density increase. These drawings use identification numbers 162, 164, 166; and 172, 174, 176 to highlight some of the different groups of the same structural fill elements 120 shown in FIGS. 1A-2, that are discussed above.

Thus, in the inductor structure 104 in FIG. 3 the number of structural fill elements in the groups of structural fill elements 162, 164, 166 increases as distances from the center location in the second layer 144 (that is aligned below the inner area 132) increase, thereby increasing the density of the groups of structural fill elements 162, 164, 166 as distances from the center location in the second layer 144 increase. This can be seen in FIG. 3 where the innermost group of structural fill elements 162 has less structural fill elements relative to a more outer group of structural fill elements 164, which in turn has less structural fill elements relative to an even more outer group of structural fill elements 166. This inductor structure 104 therefore includes insulating gaps in areas of the second layer 144 where there is only insulator material between the groups of structural fill elements 162, 164, 166, and such gaps can be, in some embodiments, aligned only below the windings of the inductor 110 (to further reduce capacitance effects).

Grouping the structural fill elements allows the groups of structural fill elements 162, 164, 166 to be located in areas of the second layer 144 that are not aligned below (in the first direction) the inductor windings 110. Instead, as shown in FIG. 3, the structural fill elements 162, 164, 166 can be mostly located in areas of the second layer 144 that are aligned below (in the first direction) insulation-only areas of the first layer 148. Keeping the structural fill elements 162, 164, 166 in areas that are not aligned with the inductor windings 110 further contributes to reducing the parasitic affect the structural fill elements 152, 154, 156 can have on the inductor windings 110, thereby further enhancing Q.

FIG. 4 is also a cross-sectional conceptual diagram that illustrates a further inductor structure 106 herein that similarly includes the first layer 148 that has the inductor windings 110 in an insulator. Again, the inner area 132 of the first layer 148 is at least partially enclosed by the inductor windings 110 and the outer area 136 of the first layer 148 is separated from the inner area 132 by the inductor windings 110.

As with the inductor structure 104 shown in FIG. 3, with the inductor structure 106 shown in FIG. 4 the number of structural fill elements in the groups of structural fill elements 172, 174, 176 increases as distances from the center location in the second layer 144 increase (e.g., the groups 172, 174, 176 get larger as distances from the center location in the second layer 144 increase). Specifically, as shown in FIG. 4, the innermost group of structural fill elements 172 has less structural fill elements relative to a more outer group of structural fill elements 174, which in turn has less structural fill elements relative to an even more outer group of structural fill elements 176. In addition, the groups of structural fill elements 172, 174, 176 in the inductor structure 102 are different distances from the first layer 148. This can be seen, for example, in FIG. 4, where the top of the innermost group of structural fill elements 172 is furthest from the first layer 148, the top of a mid-location group of structural fill elements 174 is closer to the first layer 148, and the top of the outermost group of structural fill elements 176 is even closer to the first layer 148.

Figure 5A:
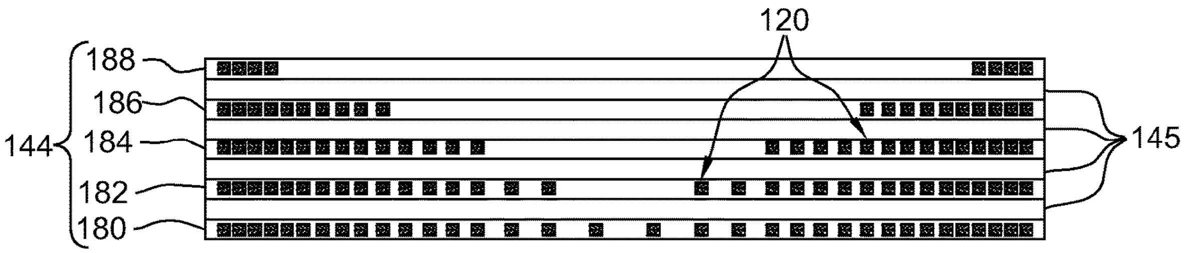
FIGS. 5A-5B are, respectively, cross-sectional and top-view schematic diagrams illustrating a layer with structural elements according to embodiments herein.
Figure 5B:
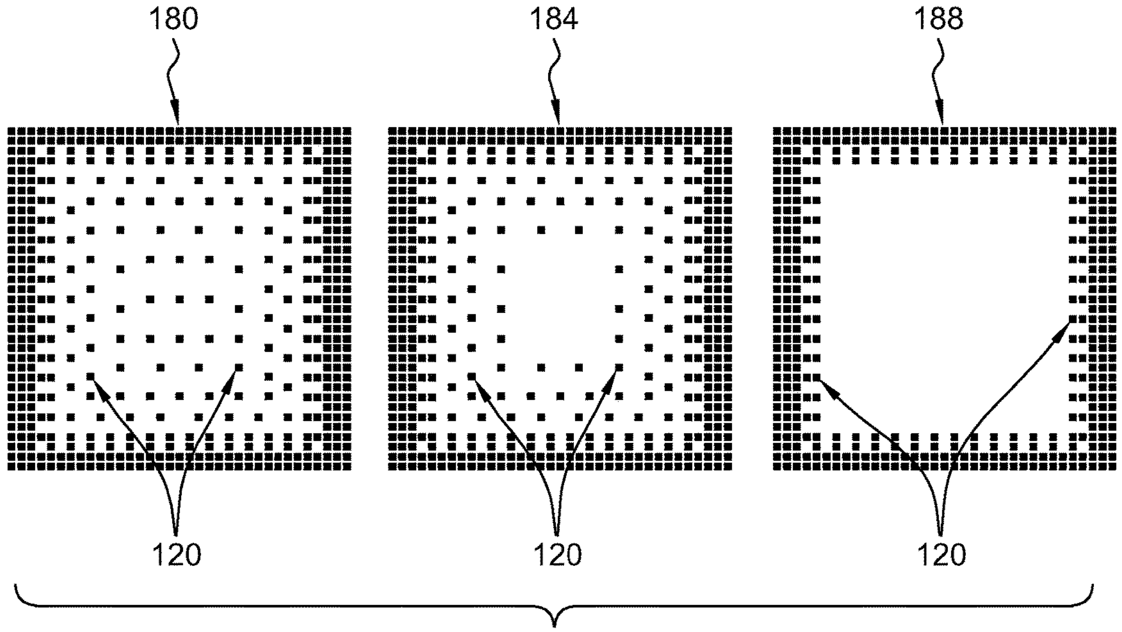

As mentioned above, the second layer 144 can actually be a multi-layer structure and the same is shown in FIGS. 5A-5B. Specifically, FIG. 5A is a cross-sectional view of one example of the second layer 144 that includes metal layers 180, 182, 184, 186, 188 with intervening insulator layers 145. FIG. 5B shows three of the metal layers, 180, 184, and 188 in top view.

As can be seen in FIG. 5B, in each of the metal fill layers 180, 184, 188 the density of the structural fill elements 120 increases as the distance from the center of the second layer increases. Also, in metal layer 180, the structural fill elements 120 at the center are relatively the most dense when compared to metal layers 184, in which the center is less dense with structural fill elements 120, and to metal layer 188 in which the center is less dense still. Further, the relative decreasing central density of the structural fill elements 120 in layer 184 and further decreasing density in layer 188 keeps the tops of the structural fill elements 120 in the center of the second layer 144 further from the first layer 148 relative to the more outer structural fill elements 120.

Figure 6:
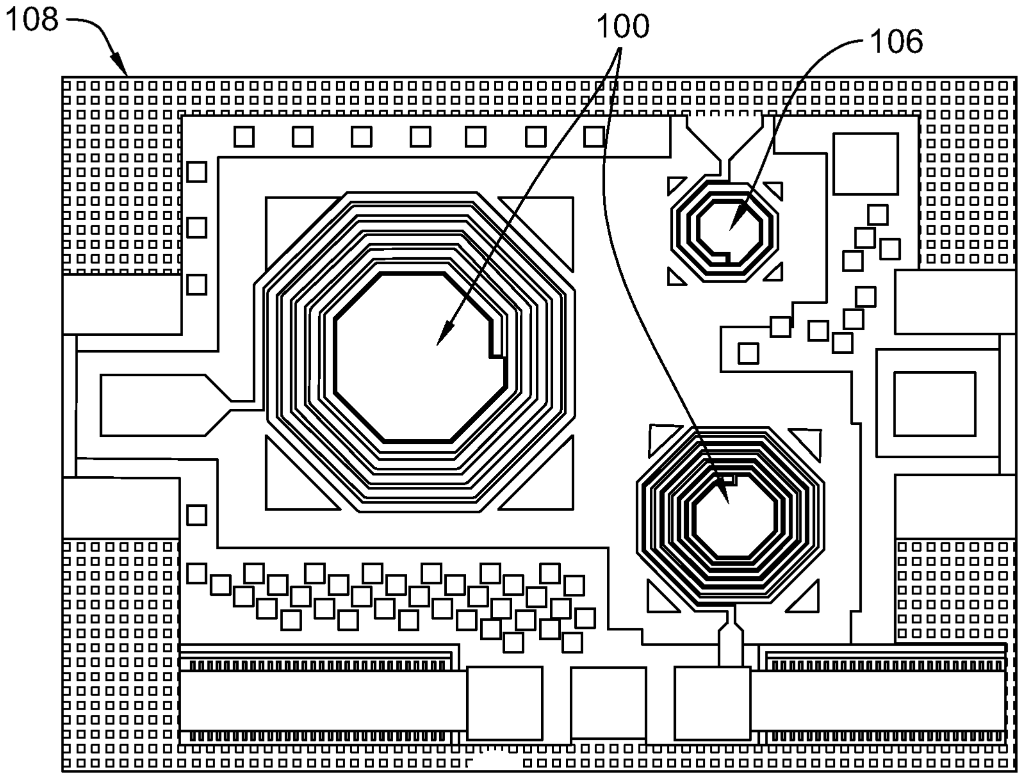
FIG. 6 is a top view schematic diagram illustrating an integrated circuit structure according to embodiments herein.

FIG. 6 shows some of the inductor structures described above (inductor structures 100 and 106 in this example) within an integrated circuit device 108. While the same inductor structure 100 can be used in all locations within the integrated circuit device 108, in other examples different inductor structures can be used within the same integrated circuit device 108.

As noted above, the structural fill elements 120 are sometimes formed from conductive materials (e.g., metals, etc.) because such materials are used in existing processing steps, and because they provide good structural rigidity. However, such conductors in combination with the surrounding insulator layers can act as capacitors, which increases parasitic capacitance and reduces the output of the inductor structure. This decreases the effectiveness of the inductor structure and lowers its quality factor (Q).

Working to reduce such unwanted parasitic capacitance while still promoting structural rigidity, it was found that the voltage is highest at the center of the inductor and that voltage decreases in the outer areas of the inductor. This information was used to modify traditional structures to move conductive elements away from the center to the outer regions of the structure (in both horizontal and vertical directions). Doing so dramatically reduces or eliminates parasitic capacitance where voltage is highest (at the inductor center), gaining the most in performance. The higher density of the structural fill elements in the outer areas of the inductor structure has minimal effect on device performance because those outer regions output lower energies. This effect can be seen in FIG. 7, which is discussed below.

Figure 7:
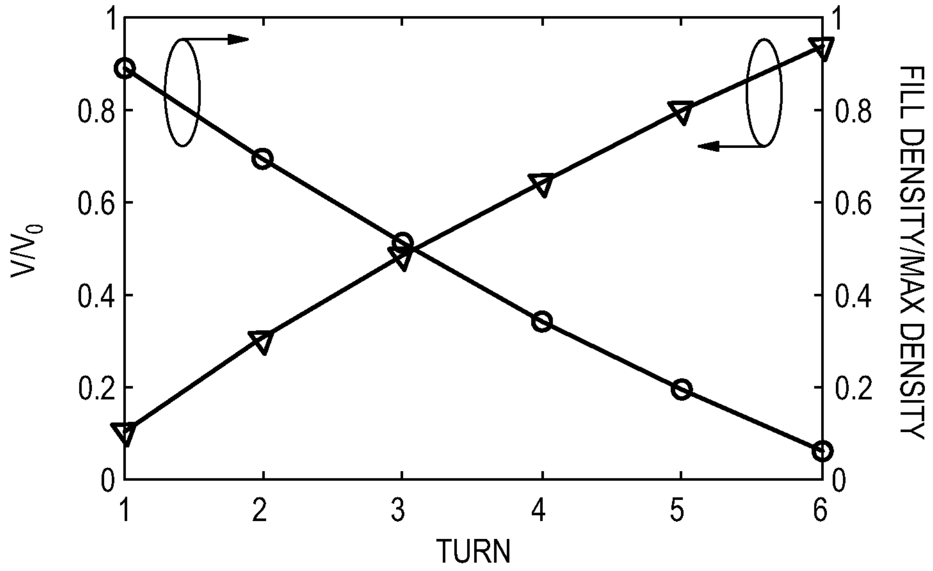
FIG. 7 is a graph showing voltage and fill density across windings of inductor structures according to embodiments herein.

More specifically, FIG. 7 is a graph showing voltage and structural fill element density relative to the number of turns or windings of the inductor structure. The turn number increases as distances from the center of the inductor structure increase. Therefore, as shown in FIG. 1A for example, the innermost winding 116 of the inductor windings 110 is the first turn (lowest number winding), while the outermost winding 118 of the inductor windings 110 is the last turn (highest number winding). As can be seen in the line having triangles in FIG. 7, the density of the structural fill elements increases as distances from the center (and the turn number) increase. However, the inductor output (represented in voltage units and shown by the line with circles in FIG. 7) does the opposite and decreases as distances from the center (and the turn (winding) number) increase.

In reverse excitation of the structure shown in FIG. 1A, a voltage source is connected to the inner turn (e.g., connected to contact 112 in FIG. 1A) and relatively lower voltage or ground is connected to the outer turn (e.g., connected to contact 114 in FIG. 1A). With such connections, the inner turns have the higher potential voltage, and the voltage potential reduces from the inner turns (e.g., 116) to the outer turns (e.g., 118). In order to optimize the oxide capacitance (underneath the spiral to the substrate), the structural fill elements 120 are placed sparsely at the center and a higher density of structural fill elements 120 are present in the outer region of inductor. Hence, such inductor structures have increasing fill density moving radially outwards from the inner region to the outer region of the inductor in order to reduce parasitic capacitance and improve Q.

For purposes herein, an "insulator" is a relative term that means a material or structure that allows substantially less (<95%) electrical current to flow than does a "conductor." The dielectrics (insulators) mentioned herein can, for example, be grown from either a dry oxygen ambient or steam and then patterned. Alternatively, the dielectrics herein may be formed (grown or deposited) from any of the many candidate low dielectric constant materials (low-K (where K corresponds to the dielectric constant of silicon dioxide) materials such as fluorine or carbon-doped silicon dioxide, porous silicon dioxide, porous carbon-doped silicon dioxide, spin-on silicon or organic polymeric dielectrics, etc.) or high dielectric constant (high-K) materials, including but not limited to silicon nitride, silicon oxynitride, a gate dielectric stack of $SiO_2$ and $Si_3N_4$, hafnium oxide ($HfO_2$), hafnium zirconium oxide ($HfZrO_2$), zirconium dioxide ($ZrO_2$), hafnium silicon oxynitride (HfSiON), hafnium aluminum oxide compounds ($HfAlO_x$), other metal oxides like tantalum oxide, etc. The thickness of dielectrics herein may vary contingent upon the required device performance.

The conductors mentioned herein can be formed of any conductive material, such as polycrystalline silicon (polysilicon), amorphous silicon, a combination of amorphous silicon and polysilicon, and polysilicon-germanium, rendered conductive by the presence of a suitable dopant. Alternatively, the conductors herein may be one or more metals, such as tungsten, hafnium, tantalum, molybdenum, titanium, or nickel, or a metal silicide, any alloys of such metals, and may be deposited using physical vapor deposition, chemical vapor deposition, or any other technique known in the art.

While only one or a limited number of inductors are illustrated in the drawings, those ordinarily skilled in the art would understand that many different types inductors could be simultaneously formed with the embodiment herein and the drawings are intended to show simultaneous formation of multiple different types of transistors; however, the drawings have been simplified to only show a limited number of inductors for clarity and to allow the reader to more easily recognize the different features illustrated. This is not intended to limit this disclosure because, as would be understood by those ordinarily skilled in the art, this disclosure is applicable to structures that include many of each type of inductor shown in the drawings.

The terminology used herein is for the purpose of describing particular embodiments only and is not intended to be limiting of the foregoing. As used herein, the singular forms "a," "an," and "the" are intended to include the plural forms as well, unless the context clearly indicates otherwise. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements).

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the foregoing has been described in detail in connection with only a limited number of embodiments, it should be readily understood that the embodiments herein are not limited to such disclosure. Rather, the elements herein can be modified to incorporate any number of variations, alterations, substitutions or equivalent arrangements not heretofore described, but which are commensurate with the spirit and scope herein. Additionally, while various embodiments have been described, it is to be understood that aspects herein may be included by only some of the described embodiments. Accordingly, the claims below are not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later, come to be known, to those of ordinary skill in the art are expressly incorporated herein by reference and intended to be encompassed by this disclosure. It is therefore to be understood that changes may be made in the particular embodiments disclosed which are within the scope of the foregoing as outlined by the appended claims.

What is claimed is:

1. A structure comprising:

a first layer comprising inductor windings arranged in a multi-winding spiral coil shape, wherein an inner area of the first layer is at least partially enclosed by the inductor windings and an outer area of the first layer is separated from the inner area by at least one winding of the inductor windings; and a second layer comprising structural fill elements, wherein the first layer and the second layer are parallel, and the second layer is relatively below the first layer in a direction perpendicular to the first layer, wherein, within the second layer, the structural fill elements are located below the inner area, below at least some of the inductor windings, and below the outer area, and wherein the structural fill elements have a density that increases from innermost structural fill elements below the inner area to outermost structural fill elements below the outer area.

2. The structure in claim 1, wherein the density of the structural fill elements increases as distances increase from a location in the second layer that is aligned below a center of the inner area.

3. The structure in claim 1, wherein the second layer comprises a multi-layer structure having alternating layers of insulator between layers of the structural fill elements.

4. The structure in claim 1, wherein the inductor windings comprise a plurality of successively larger windings extending from the inner area, and wherein a density of the structural fill elements successively increases in each area of the second layer that is aligned below each successively larger winding.

5. The structure in claim 1, further comprising a third layer comprising an insulator, wherein the third layer is parallel to and between the first layer and the second layer.

6. The structure in claim 1, wherein the inductor windings comprise at least one of: a spiral conductor; a curved conductor; a rectangular conductor; and a polygonal conductor.

7. The structure in claim 1, wherein the inductor windings each have an open loop shape where ends of the inductor windings are electrically insulated from each other.

8. A structure comprising:

a first layer comprising inductor windings arranged in a multi-winding spiral coil shape, wherein an inner area of the first layer is at least partially enclosed by the inductor windings and an outer area of the first layer is separated from the inner area by at least one winding of the inductor windings; and a second layer comprising structural fill elements, wherein the first layer and the second layer are parallel, and the second layer is relatively below the first layer in a direction perpendicular to the first layer, wherein, within the second layer, the structural fill elements are located below the inner area, below at least some of the inductor windings, and below the outer area, and wherein the structural fill elements have separation distances that decrease from innermost structural fill elements below the inner area to outermost structural fill elements below the outer area such that a density of the structural fill elements increases from the innermost structural fill elements to the outermost structural fill elements.

9. The structure in claim 8, wherein the density of the structural fill elements increases as distances increase from a location in the second layer that is aligned below a center of the inner area.

10. The structure in claim 8, wherein the second layer comprises a multi-layer structure having alternating layers of insulator between layers of the structural fill elements.

11. The structure in claim 8, further comprising a third layer comprising an insulator, wherein the third layer is parallel to and between the first layer and the second layer.

12. The structure in claim 8, wherein the inductor windings comprise at least one of: a spiral conductor; a curved conductor; a rectangular conductor; and a polygonal conductor.

13. The structure in claim 8, wherein the inductor windings each have an open loop shape.

14. The structure in claim 8, wherein, within the second layer, the structural fill elements extend radially from below the inner area to below the outer area.

15. The structure in claim 8, wherein, within the second layer, the structural fill elements are in columns.

16. A structure comprising:

a first layer comprising inductor windings arranged in a multi-winding spiral coil shape, wherein an inner area of the first layer is at least partially enclosed by the inductor windings and an outer area of the first layer is separated from the inner area by at least one winding of the inductor windings; and a second layer comprising structural fill elements, wherein the first layer and the second layer are parallel, and the second layer is relatively below the first layer in a direction perpendicular to the first layer, wherein, within the second layer, the structural fill elements are in columns below the inner area, below at least some of the inductor windings, and below the outer area, and wherein the structural fill elements have separation distances between the columns that decrease from innermost structural fill elements in the columns below the inner area to outermost structural fill elements in the columns below the outer area such that a density of the structural fill elements increases from the innermost structural fill elements to the outermost structural fill elements.

17. The structure in claim 16, wherein the columns each have a same number of the structural fill elements.

18. The structure in claim 16, wherein the second layer comprises a multi-layer structure having alternating layers of insulator between layers of the structural fill elements in the columns.

19. The structure in claim 16, further comprising a third layer comprising an insulator, wherein the third layer is parallel to and between the first layer and the second layer.

20. The structure in claim 16, wherein the inductor windings comprise at least one of: a spiral conductor; a curved conductor; a rectangular conductor; and a polygonal conductor.

* * * * *